(12) United States Patent
Huang

(10) Patent No.: US 10,152,818 B2
(45) Date of Patent: *Dec. 11, 2018

(54) TECHNIQUES FOR STEREO THREE DIMENSIONAL IMAGE MAPPING

(71) Applicant: INTEL CORPORATION, Santa Clara, CA (US)

(72) Inventor: Chao Huang, Shanghai (CN)

(73) Assignee: INTEL CORPORATION, Santa Clara, CA (US)

(*) Notice: Subject to any disclaimer, the term of this patent is extended or adjusted under 35 U.S.C. 154(b) by 22 days.

This patent is subject to a terminal disclaimer.

(21) Appl. No.: 15/284,271

(22) Filed: Oct. 3, 2016

(65) Prior Publication Data
US 2017/0124752 A1 May 4, 2017

Related U.S. Application Data

(63) Continuation of application No. 14/142,013, filed on Dec. 27, 2013, now Pat. No. 9,460,543.

(Continued)

(51) Int. Cl.
| | |
|---|---|
| *G06T 15/00* | (2011.01) |
| *G06T 3/40* | (2006.01) |
| *H04N 13/128* | (2018.01) |
| *G06T 7/13* | (2017.01) |
| *A63F 13/25* | (2014.01) |

(Continued)

(52) U.S. Cl.
CPC .............. *G06T 15/00* (2013.01); *A63F 13/25* (2014.09); *G06T 3/403* (2013.01); *G06T 7/13* (2017.01); *G06T 7/90* (2017.01); *H04N 13/128* (2018.05); *H04N 13/144* (2018.05); *G06T 2207/10012* (2013.01); *G06T 2207/10024* (2013.01); *G06T 2207/10028* (2013.01); *G06T 2207/20228* (2013.01)

(58) Field of Classification Search
None
See application file for complete search history.

(56) References Cited

U.S. PATENT DOCUMENTS

| | | | | |
|---|---|---|---|---|
| 2008/0247670 | A1* | 10/2008 | Tam | H04N 13/0257 |
| | | | | 382/298 |
| 2011/0261050 | A1* | 10/2011 | Smolic | G06T 15/20 |
| | | | | 345/419 |

(Continued)

OTHER PUBLICATIONS

Cruz, Leandro, Djalma Lucio, and Luiz Velho. "Kinect and rgbd images: Challenges and applications." Graphics, Patterns and Images Tutorials (SIBGRAPI-T), 2012 25th SIBGRAPI Conference on. IEEE, 2012. 14 pages.*

(Continued)

*Primary Examiner* — Ryan P Potts

(57) ABSTRACT

An apparatus may include a processor to retrieve a stereo three dimensional (S3D) frame of an S3D game, the frame comprising a red-green-blue (RGB) frame and depth frame; and an interest aware disparity mapping component to: generate a depth edge frame from the depth frame; and to generate a depth distribution diagram for the depth frame based on the depth edge frame, the depth distribution diagram defining a multiplicity of camera regions for generating a mapped S3D frame for a target device based upon viewing parameters of the target device.

25 Claims, 15 Drawing Sheets

Related U.S. Application Data

(60) Provisional application No. 61/829,723, filed on May 31, 2013.

(51) Int. Cl.
  *G06T 7/90* (2017.01)
  *H04N 13/144* (2018.01)

(56) References Cited

U.S. PATENT DOCUMENTS

| | | | | |
|---|---|---|---|---|
| 2011/0273530 | A1* | 11/2011 | Suh | H04N 13/0048 348/42 |
| 2011/0285813 | A1* | 11/2011 | Girdzijauskas | H04N 13/128 348/42 |
| 2012/0269458 | A1* | 10/2012 | Graziosi | H04N 19/597 382/299 |
| 2012/0274634 | A1* | 11/2012 | Yamada | G06K 9/00362 345/419 |
| 2012/0280996 | A1* | 11/2012 | Kannan | G06T 15/20 345/426 |
| 2013/0100114 | A1* | 4/2013 | Lynch | G01C 21/3638 345/419 |
| 2013/0187910 | A1* | 7/2013 | Raymond | G09G 5/14 345/419 |
| 2014/0210963 | A1 | 7/2014 | Tanaka et al. | |
| 2014/0218481 | A1 | 8/2014 | Hegemann et al. | |

OTHER PUBLICATIONS

Extended European Search Report received for European Patent Application No. 14803883.9, dated Dec. 6, 2016, 12 pages.
Graziosi et al., "Depth Map Up-sampling Based on Edge Layers", Signal & Information Processing Association Annual Summit and Conference, IEEE, Dec. 3, 2012, 4 pages.

* cited by examiner

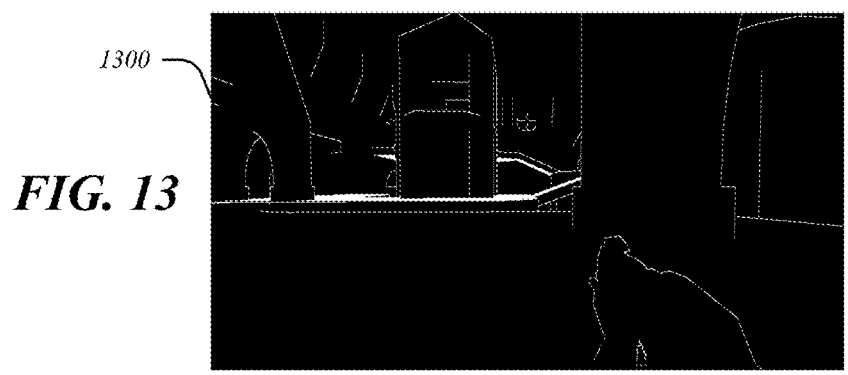
FIG. 12A 1202
FIG. 12B 1204
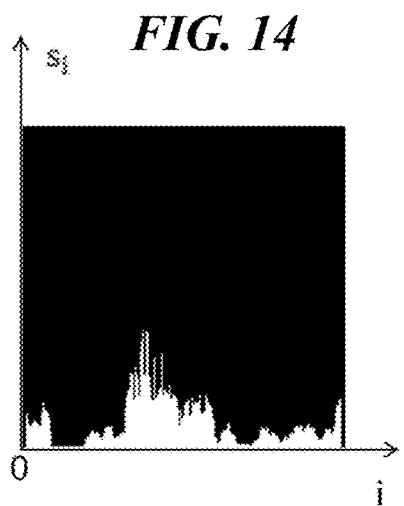
FIG. 13 1300
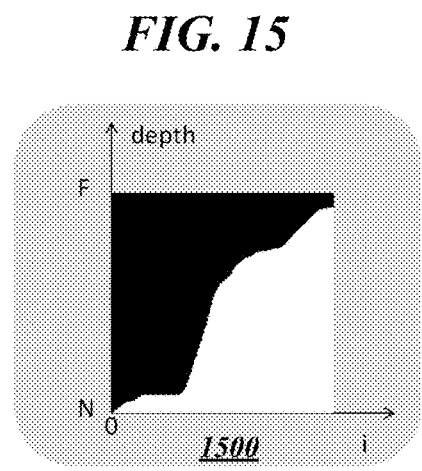
FIG. 14
FIG. 15 1500

TECHNIQUES FOR STEREO THREE DIMENSIONAL IMAGE MAPPING

RELATED APPLICATIONS

This application claims the benefit of and priority to previously filed U.S. patent application Ser. No. 14/142,013 filed Dec. 27, 2013, entitled "TECHNIQUES FOR STEREO THREE DIMENSIONAL IMAGE MAPPING" which claims the benefit of U.S. Provisional Patent Application Ser. No. 61/829,723, filed May 31, 2013; both of which are hereby incorporated by reference in their entirety.

BACKGROUND

Three-dimensional (3D) gaming is becoming increasingly popular. As with other types of multimedia content, one design goal for 3D games is to allow uninterrupted operation across a wide range of electronic devices, such as personal computer, tablet computer and smart phone. 3D gaming across different devices, however, remains a challenge due to a number of factors, not the least of which is that viewers have limited depth perception. If a viewer's perceived scene is outside of a comfortable viewing range, the viewer may experience eyestrain or other physical discomfort. A comfortable viewing range is dependent, at least in part, on screen size. Therefore, playing a 3D game across different devices with different screen sizes remains a design challenge not answered by conventional cross-platform solutions.

BRIEF DESCRIPTION OF THE DRAWINGS

FIGS. 12A and 12B show one exemplary implementation in which conventional Roberts kernels are chosen to perform edge detection.

FIG. 13 presents a depth edge frame (diagram) derived from the process of FIGS. 12A and 12B.

FIG. 14 presents an example graph (grayscale diagram).

FIG. 15 presents an exemplary depth distribution diagram.

DETAILED DESCRIPTION

Figure 1:
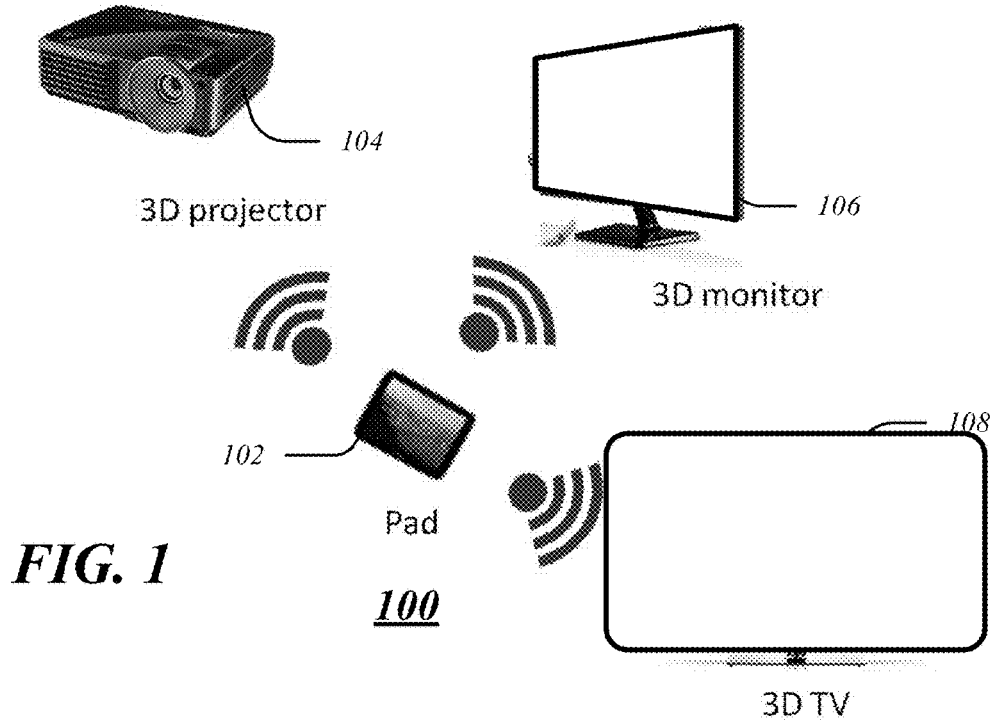
FIG. 1 depicts one embodiment of a system for mapping of S3D content to multiple different devices.

Embodiments provide enhancements to sharing and viewing of stereoscopic 3D (S3D, or simply "3D") content among digital display devices in which screen size, among other properties, may vary. The embodiments provide an enhanced usage model of a computing continuum in which a target device configuration to display 3D content is obtained before 3D content sharing is performed. The present embodiments in particular present techniques that may be performed in real-time to perform disparity mapping and are referred to herein as "interest aware disparity mapping" operations or algorithms.

By way of background, three dimensional (3D) television (TV) is widely used for watching stereo (or stereoscopic) 3D (S3D) movies and TV programs. However, there are as yet few S3D games in use. One reason for this may include costs of purchasing a S3D monitor for playing games on a personal computer (PC) or a S3D mobile device to play S3D mobile games.

With the ubiquitous deployment and interconnectivity of computing and communications devices and the development of a computer continuum, technical content is readily shared across multiple different devices. In contrast, usage models are lacking for playing and deploying stereo 3D games across different devices. In some scenarios, for example, it may be more convenient for users to use mobile phones or tablet devices as input to play stereo games on a large television (TV) screen or PC monitor. Moreover, for game developers, it is convenient to maintain a single code base that can perform well on different digital displays (screens) having different screen sizes.

Due to the lack of consideration in adapting use of stereo 3D displays for the computer continuum, stereo 3D depth mapping for different devices has been wholly ignored. Typically, S3D game development is done in a manner in which a computer game/video is designed for a dedicated device without consideration of deployment of the game on different digital displays in which the screen size may vary.

Moreover, stereo game developers often produce only one code base for stereo 3D disparity, which is designed for a dedicated device.

One problem with this approach arises from the fact that for a given stereo 3D display, viewers have limited depth perception. If a scene being presented appears outside of a comfortable range, the viewer may experience eyestrain or other discomfort. In turn, this comfortable viewing range, or comfortable range, has a strong relationship with screen size in which the scene is viewed. In a stereo 3D display, depth is perceived by disparities that are introduced between respective images perceived by right and left eyes. In current stereo 3D games, the disparities are always adjusted for a dedicated device, resulting in a constant disparity value for a given game. However, because different digital display devices have different screen sizes and different comfortable viewing ranges, it may be uncomfortable for an end user to play a stereo 3D game on another device that does not have a similar screen size to a target screen size for which the stereo 3D game was developed.

One way to address this issue is to compress a 3D scene from game space to real display space such that the entire 3D scene is within the comfortable range. In conventional approaches, linear depth retargeting is used to perform this change, because it is easy to implement. However, if the ratio of width and depth in virtual space is different from the original ratio of the content, which is universally the case, the content in each frame has to be compressed to meet a comfortable stereo 3D range. However using linear depth mapping algorithms to compress the most important part of the content in each frame typically will cause content distortion resulting in a poor user experience for end users viewing the compressed frame.

Embodiments of the disclosure attempt to solve these and other problems. Embodiments may implement various interest aware disparity mapping operations or algorithms that allow a 3D game to be shared across multiple electronic devices in a seamless and user friendly manner.

FIG. 1 depicts one embodiment of a system 100 for mapping of S3D content to multiple different devices. In the example illustrated, the tablet device 102 sends disparity mapped S3D frames to a 3D projector 104, a 3D monitor 106 and 3D TV 108. As detailed below, each different device may be sent a different S3D content based upon the screen size and expected viewing distance of a viewer.

Figure 2:
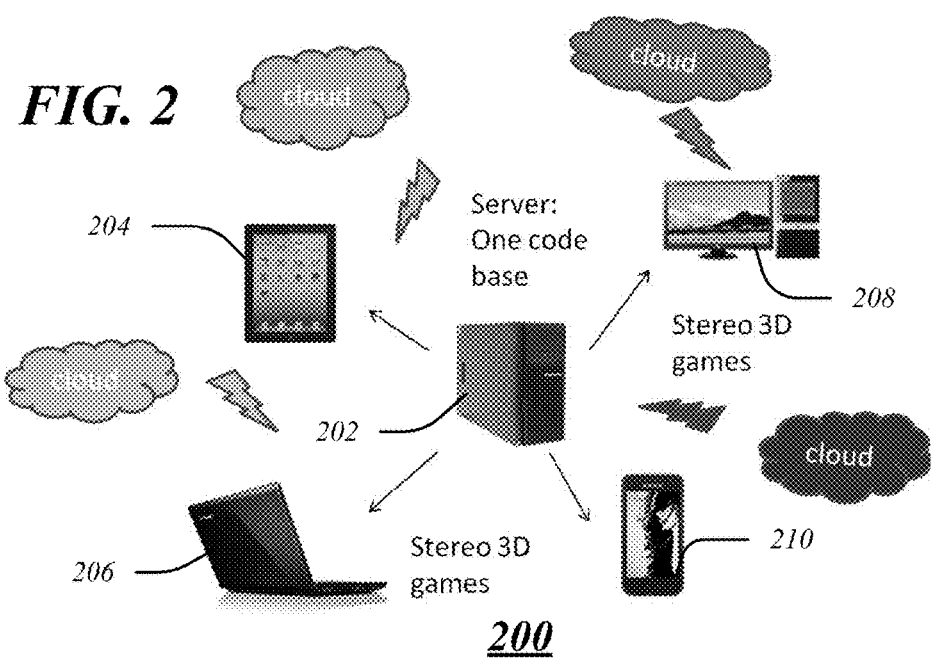
FIG. 2 depicts a further embodiment of a system in which a server generates one base code for S3D content to be deployed on multiple different devices.

FIG. 2 depicts a further embodiment of a system 200 in which a server 202 generates one base code for S3D content such as a video game to be deployed on multiple different devices having different screen sizes. In the embodiment of FIG. 2 the system 200 is a "cloud" based system in which the server 202 is located in any convenient location of a network such as the Internet. The various devices including tablet device 204, laptop 206, stereo TV 208, and smartphone 210 link via a network or combination of networks to the server 202, which may be remote from the devices. S3D content is provided in a format that is tailored for viewing without eyestrain by a viewer of each device 204,206,208, 210, and in a manner that preserves depth information for important or interesting objects or content being viewed.

Figure 3A:
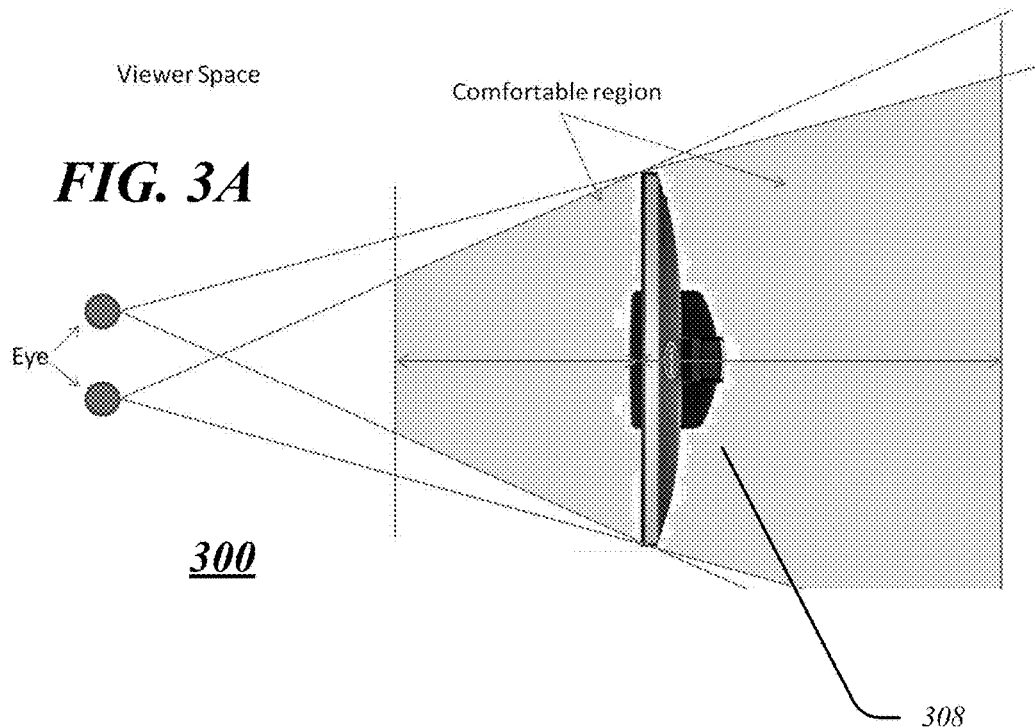
FIG. 3A illustrates general features of the geometry for properly viewing a display.

FIGS. 3A to 6 below illustrate various principles and functions that aid in explanation of operation of the present embodiments. In particular, FIG. 3A illustrates general features of the geometry for properly viewing a display. The perspective in FIG. 3A is a top down view illustrating the position of viewer's eyes 302, 304 with respect to the display 306. The region 308 represents a comfortable viewing region or zone in which objects that appear to be within the comfortable viewing region 308 do not create undue discomfort to the viewer. As illustrated, the comfortable viewing region 308 extends both in front of and behind the position of the display 306.

Figure 3B:
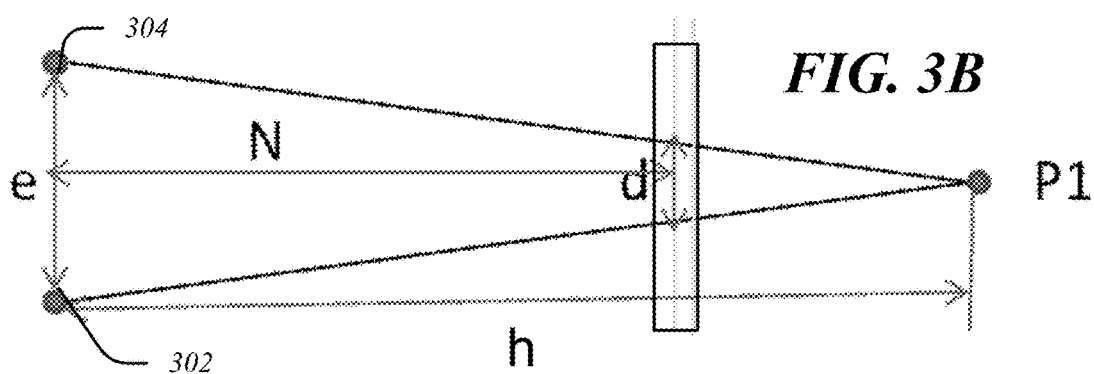
FIGS. 3B and 3C illustrate details of the geometry for the situations in which an object appears in front of and behind the display, respectively.
Figure 3C:
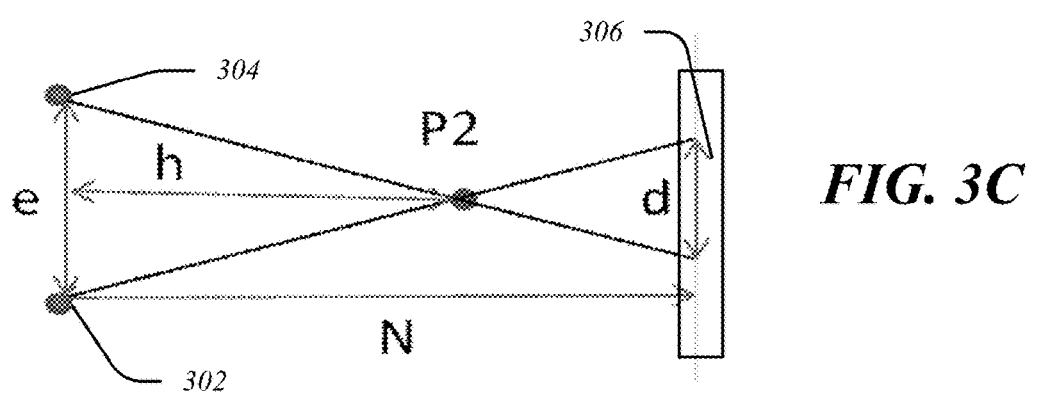

FIGS. 3B and 3C illustrate details of the geometry for the situations in which an object appears in front of and behind the display 306, respectively. In FIG. 3B, e is the distance between the viewer's eyes, d is the disparity (separation) on the screen for the same object, h is the perceived depth, and N is the expected distance between the viewer and screen. In FIG. 3B, according to similar triangles $d/e=h-N/h$. In other words, $h=eN/e-d$. In FIG. 3C, $d/e=h/N-h$ such that $h=eN/e+d$. Since e is constant for a given viewer and N is constant for a given display screen, once the disparity d is decided, the perceived depth is determined and a comfortable range 308 may be defined as detailed further below.

In conventional stereo 3D games, the disparities d are adjusted for dedicated devices and are a constant value. However, different screens (digital displays) have different screen sizes and different comfortable viewing ranges. Therefore it is often uncomfortable for end users to play a given S3D game in a device that may not have a similar screen size with that for which the given S3D game was designed by the game designers.

Figure 4:
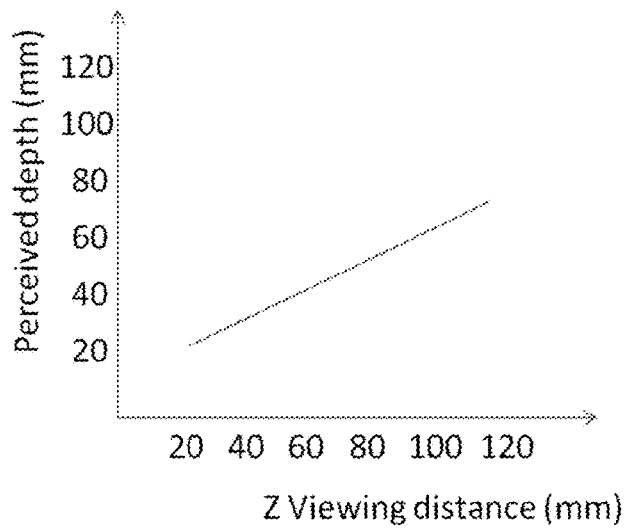
FIG. 4 illustrates a scenario when Z viewing distance is linearly compressed so that the perceived depth is less than the Z viewing distance.
Figure 5A:
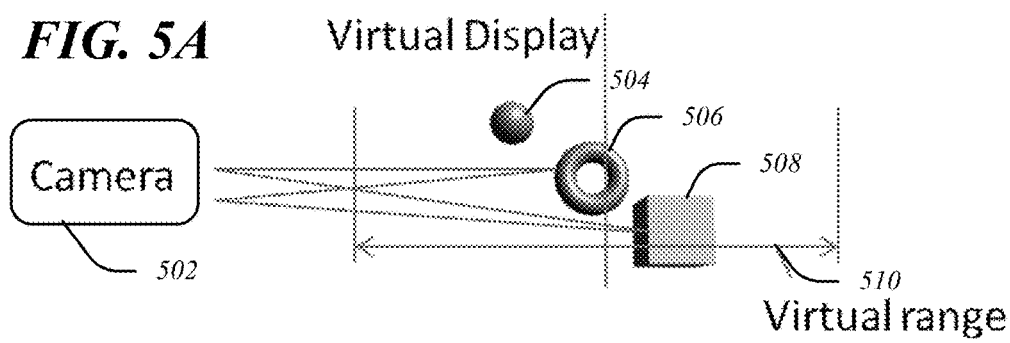
FIG. 5A illustrates the geometry of objects that are positioned with respect to a camera.

One way to address this issue is to compress 3D scene from game space to real display space and make sure all the scene is within the comfortable range. FIG. 4 illustrates that the Z viewing distance is linearly compressed so that the perceived depth is less than the Z viewing distance. FIG. 5A illustrates the geometry of objects that are positioned with respect to a camera 502. In particular, the objects 504, 506, and 508 are 3D objects that are located at various depths within a virtual range 510.

Figure 5B:
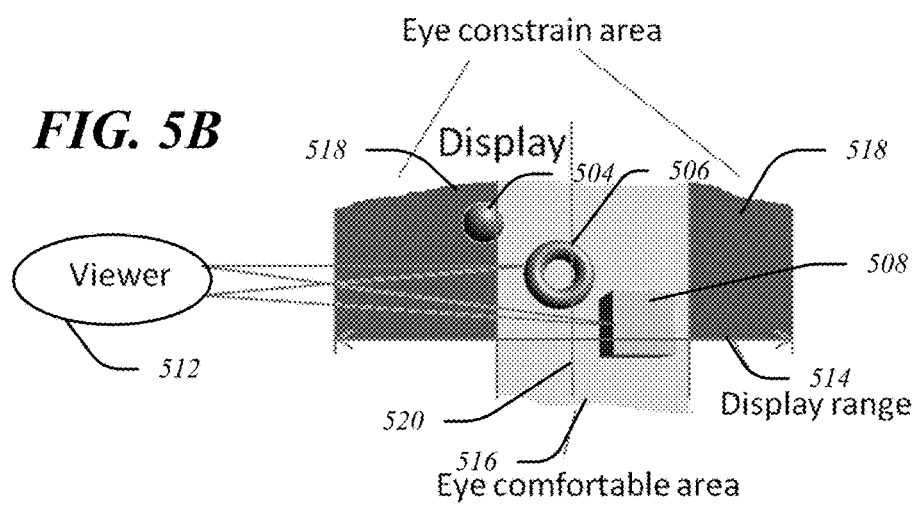
FIG. 5B shows a scenario in which objects are presented on a display so as to fall within and outside of comfortable area.

FIG. 5B shows a scenario in which the objects 504, 506, 508 are presented on the display 520 and fall within the display range 514 as follows: the objects 506, 508 fall within comfortable area 516, while the object 504 falls within the constrained range 504. Thus, the viewer 512 may experience eye strain in viewing presentation of the objects 504, 506, 508.

Figure 5C:
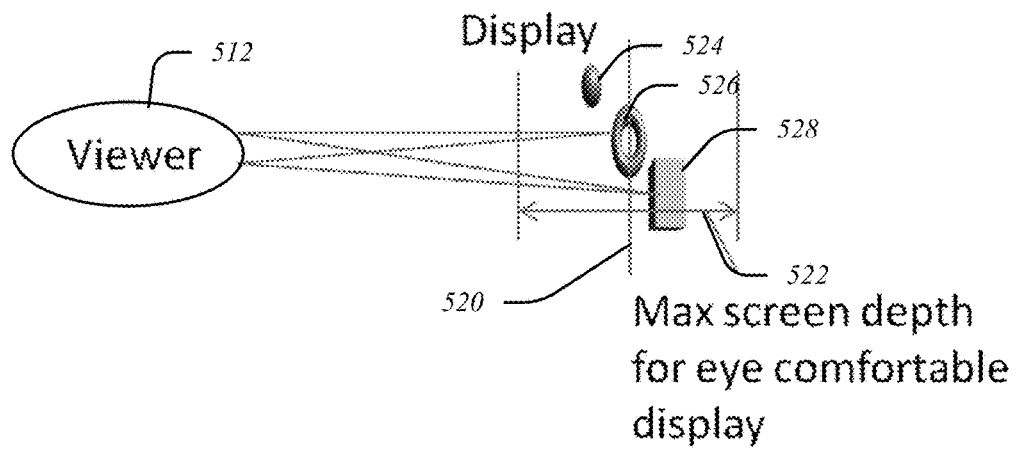
FIG. 5C illustrates the effects of linear compression so that objects all fall within a comfortable range.
Figure 6:
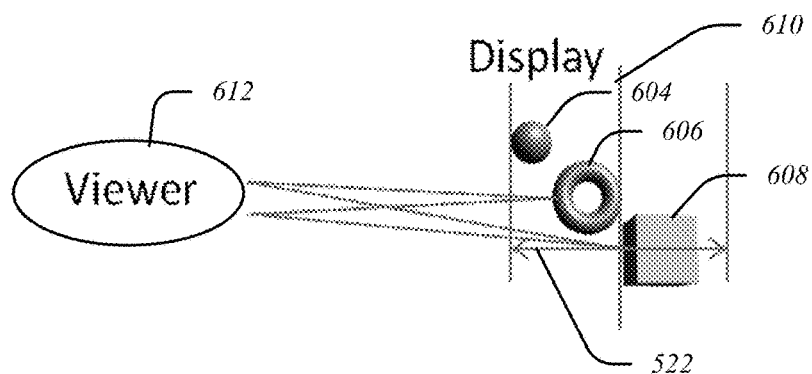
FIG. 6 presents an exemplary result of interest aware disparity mapping consistent with the present embodiments in which undistorted objects are located within a comfortable range.

In accordance with conventional approaches a so-called linear depth retargeting may be performed to compress the range within which objects 504, 506, 508 fall when presented upon the display 520. Thus, as shown in FIG. 5C, the compressed objects 524, 526, 528 all fall within comfortable range 522. However, the objects 504, 506, 508 may appear distorted as shown, thereby degrading the user experience. Moreover, due to variation in screen size and expected viewer distance, often the disparity should be adjusted to accommodate different target devices to display an S3D presentation such as a S3D game.

The present embodiments may address these issues by performing a method and framework for depth retargeting, which, is accomplished, for S3D displays by disparity mapping. This procedure is referred to herein as "interest aware disparity mapping." The present embodiments provide specific operations to accomplish interest aware disparity mapping as well as architecture for implementing the interest aware disparity mapping. The present embodiments provide a realistic way to enhance user experience when playing stereo 3D games, which creates a new usage model for the computer continuum.

Following the example of FIGS. 5A-5C, FIG. 6 presents an exemplary result of interest aware disparity mapping in which the undistorted objects 604, 606, 608 are located within the comfortable range 522. This result provides an enhanced user experience by preserving the appearance of important objects within an S3D scene while adjusting their location to fall within an acceptable viewing range that is adjusted for the size of display 610 and expected viewing distance of viewer 612.

In accordance with various embodiments, the interest aware disparity mapping may be conducted from any source device to other target devices that have displays to present S3D content. In accordance with the present embodiments, content senders, which may be termed a "source device," may first obtain receiving device information such as screen size, expected viewer distance, and other related information. Subsequently, the source device performs interest aware disparity mapping to produce disparity mapped frames according to a given target device configuration. The source device subsequently transmits the interest-aware-disparity-mapped frames to the receiving device, or "target device," with more appropriate image/game frame structure to reduce view distortion in comparison to conventional disparity mapping.

The interest aware disparity mapping operations of the present embodiments are effective to prevent viewing distortion brought about by unsuitable depth mapping, when the screen size or viewer distance is different between source video and target device. The operations according to some embodiments are designed to cause minimal change to important content of an S3D frame while performing the appropriate depth retargeting when playing stereo 3D content in different devices.

Figure 7:
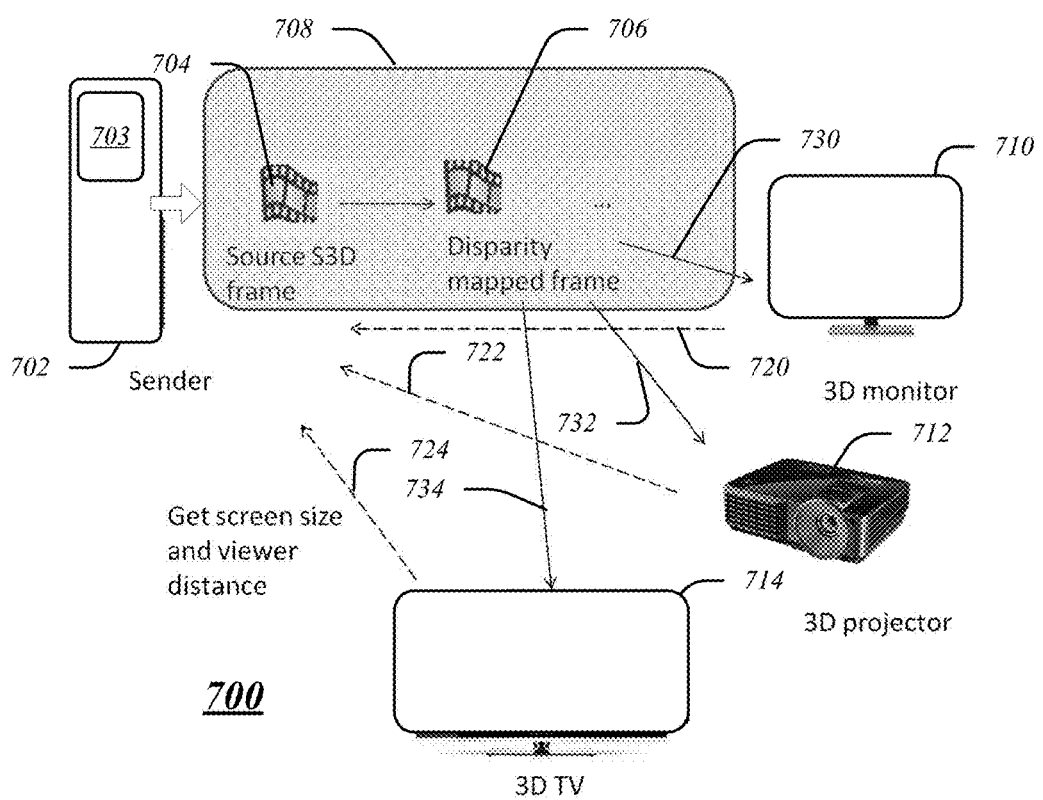
FIG. 7 illustrates one communications architecture according to some embodiments in which a sending device is a wireless device such as a user tablet.

FIG. 7 illustrates one communications architecture 700 according to some embodiments in which a source device or "sending device" 702 is a wireless device such as a user tablet. The sending device 702 is capable of wireless communications with various other devices such that the sending device 702 can wirelessly obtain device information about other devices and wirelessly transmit S3D content to those other devices. In the communications architecture 700 the sending device 702 receives wireless messages 720, 722, and 724 which include device information for 3D monitor 710, 3D projector 712, and 3D TV 714, respectively.

The sending device 702 is equipped with an interest aware disparity mapping component 708 that performs disparity mapping according to the device information received, which information may include screen size and/or expected viewing distance as example device information. A processor 703 may retrieve a source S3D frame 704 of an S3D video (not shown) for mapping to one or more different receiving devices (target devices). As detailed below, the interest aware disparity mapping component 708 processes each source S3D frame 704 to generate a disparity mapped frame 706 for each receiving device, which disparity mapped frame may differ among the 3D monitor 710, 3D projector 712, and 3D TV 714. As illustrated, the respective disparity mapped frames 706 are sent via respective messages 730, 732, 734 to 3D monitor 710, 3D projector 712, and 3D TV 714. The S3D procedures generally outlined in FIG. 7 may be performed in real-time such that disparity mapping for a target device is carried out when S3D content is to be sent to that target device. Notably, the disparity map frame 706 may vary for each receiving device, such as the 3D monitor 710, 3D projector 712, and 3D TV 714.

Figure 8:
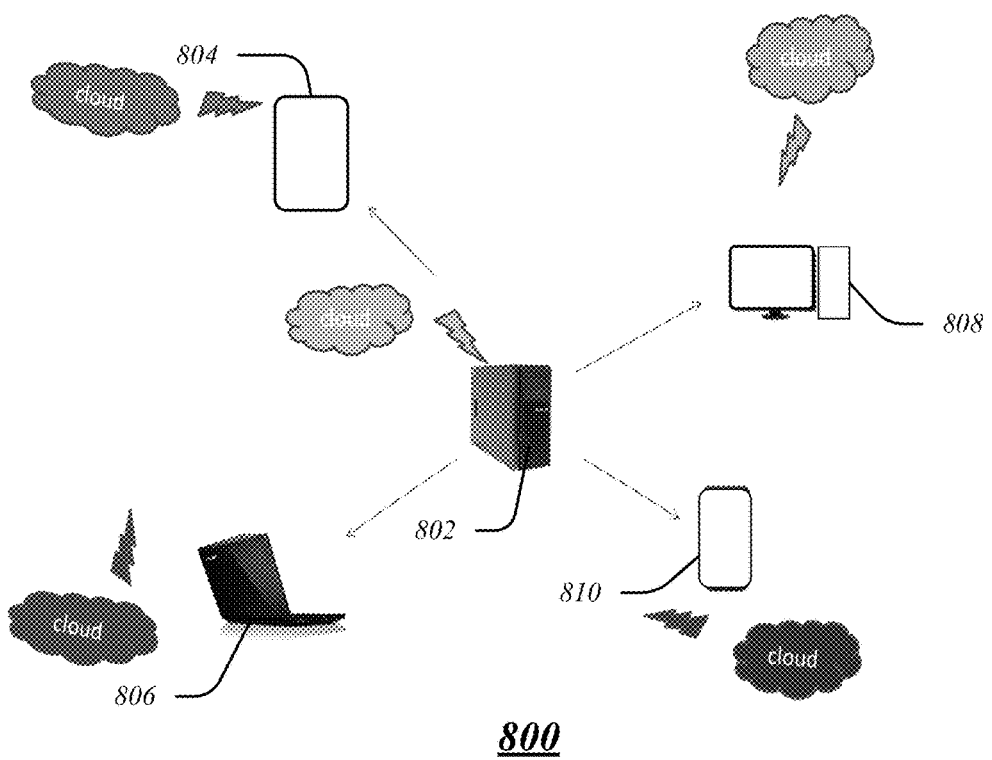
FIG. 8 illustrates another communications architecture according to other embodiments in which a sending device is a server that includes one code base for a given S3D game.

FIG. 8 illustrates another communications architecture 800 according to other embodiments in which a sending device is a server 802 that includes one code base for a given S3D game. It is to be noted that in the present embodiments a source device may have a communications interface for sending and receiving information to and from a target device via wireless transmission, wired transmission, or a combination or wired and wireless transmission. The communications architecture 800 is a cloud based architecture in which the server 802 is communicatively linked with various other devices over one or more networks that may include wired links, wireless links, or a combination of the two (not shown). The server 802 may perform interest aware disparity mapping to provide S3D frames that are tailored to the receiving device such as the tablet 804, laptop device 806, desktop device/3D monitor 808, or smartphone 810. As with the scenario of FIG. 7, the disparity mapping may be carried out in real time.

Figure 9:
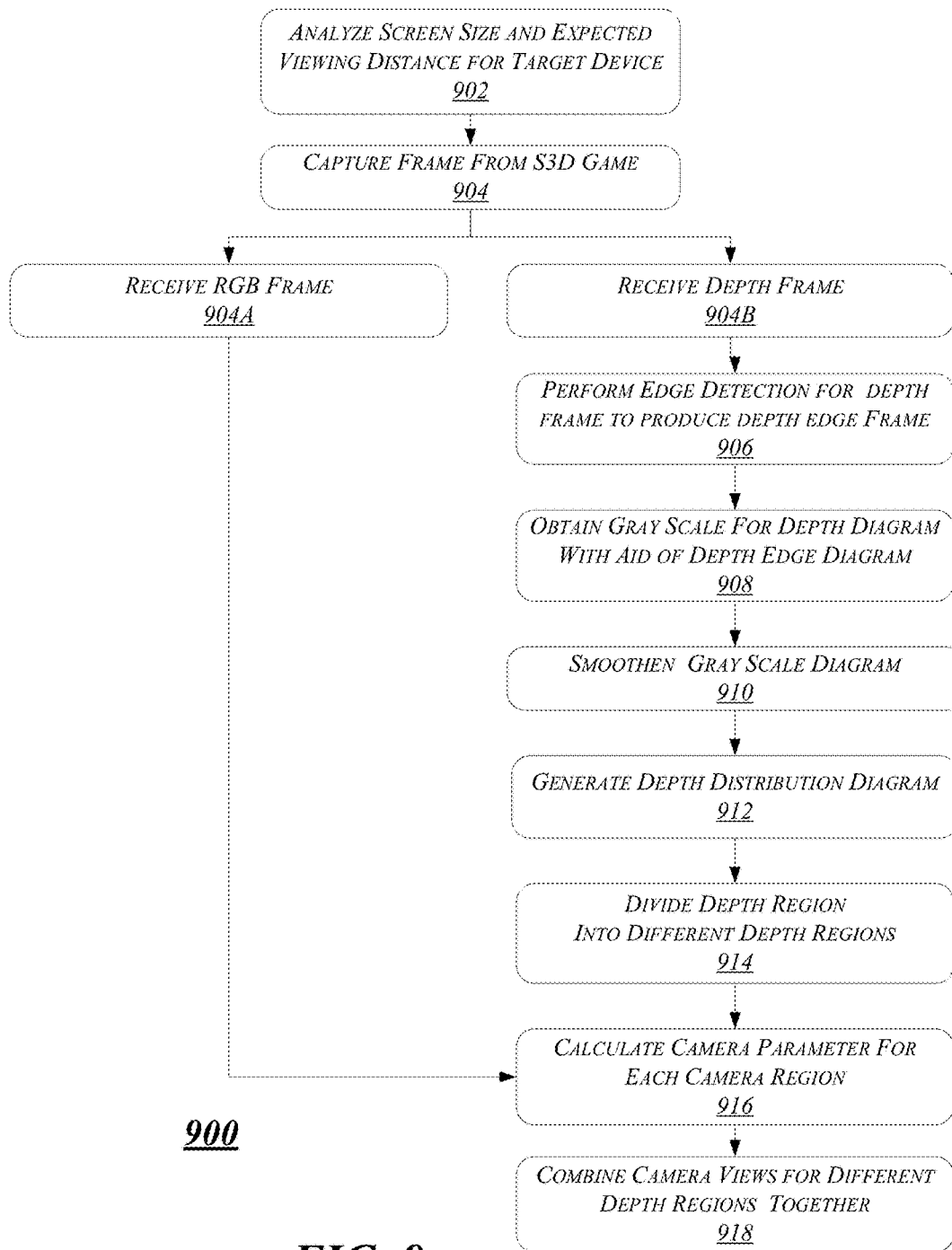
FIG. 9 depicts an exemplary logic flow.

FIG. 9 depicts an exemplary logic flow 900. The exemplary logic flow 900 presents features of interest aware disparity mapping according to embodiments of the disclosure. The FIGS. 10 to 22 and appurtenant text to follow present details of implementation of the logic flow consistent with various embodiments. The logic flow 900 may be used by a source device to prepare S3D frames for presentation on a target device. The source device and target device may be located proximate one another or remote from one another in different embodiments as discussed above with respect to FIGS. 7 and 8.

At block 902, screen size and expected viewing distance is analyzed for a target device. This analysis may be based upon device information received from the target device. The target device information may be sent in a message from the target device to a source device in one example.

At block 904 a frame is captured from a digital game. In various embodiments the digital game is an S3D game. The frame may be captured as a color image frame (RGB frame) 904A and a depth frame 904B. A depth frame may be set of depth values that presented as a function of position within a frame, and may therefore map onto corresponding RGB information in an RGB frame. The depth frame may be calculated in real-time after an RGB frame is loaded in some embodiments.

At block 906 edge detection is performed for a depth frame (diagram) to produce a depth edge diagram. At block 908, a gray scale is obtained for the depth diagram with the aid of the depth edge diagram. At block 910 a smoothening of the grayscale diagram is performed. At block 912, a depth distribution diagram is generated. At block 914 a depth region is divided into different depth (camera) regions for different cameras. At block 916, a camera parameter is generated for each camera region is generated. At block 918, camera views with different depth regions are added together. Details of exemplary implementation of the logic flow 900 are set forth in the figures to follow.

Figure 10:
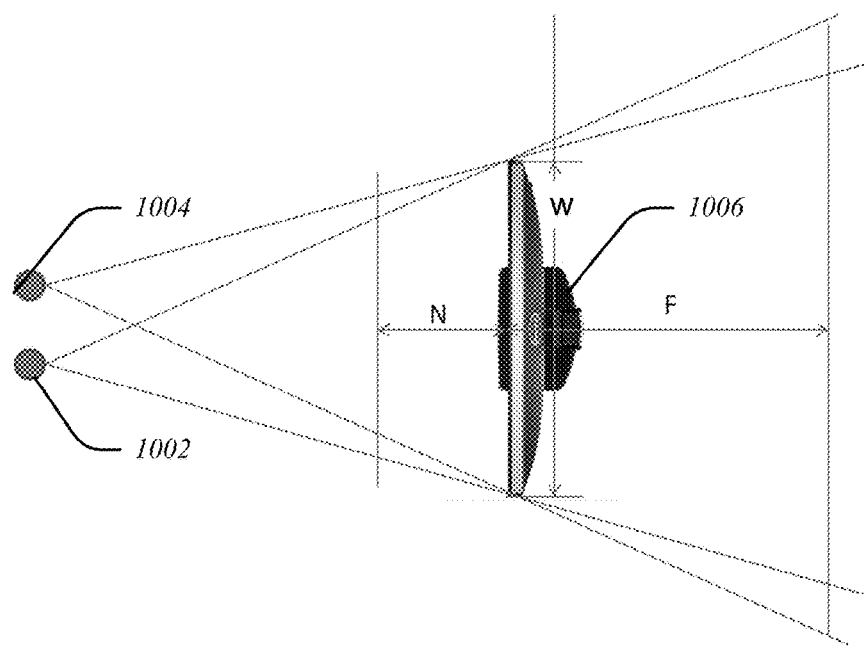
FIG. 10 illustrates exemplary geometry showing parameters relevant to analysis of screen size and expected viewer distance.

FIG. 10 illustrates exemplary geometry showing parameters relevant to analysis of screen size and expected viewer distance. When viewing stereo 3D, users whose eyes 1002 and 1004 are shown, may experience a comfortable perceived depth with respect to the screen 1006 as shown. In particular, N is the acceptable distance in front of the display 1006 and F is the acceptable distance behind (inside) the display 1006. The parameter W represents the screen width. In some examples, N is 0.4 W and F is 0.7 W. Accordingly, knowledge of W may generate directly the calculation of acceptable distances N and F.

Figure 11A:
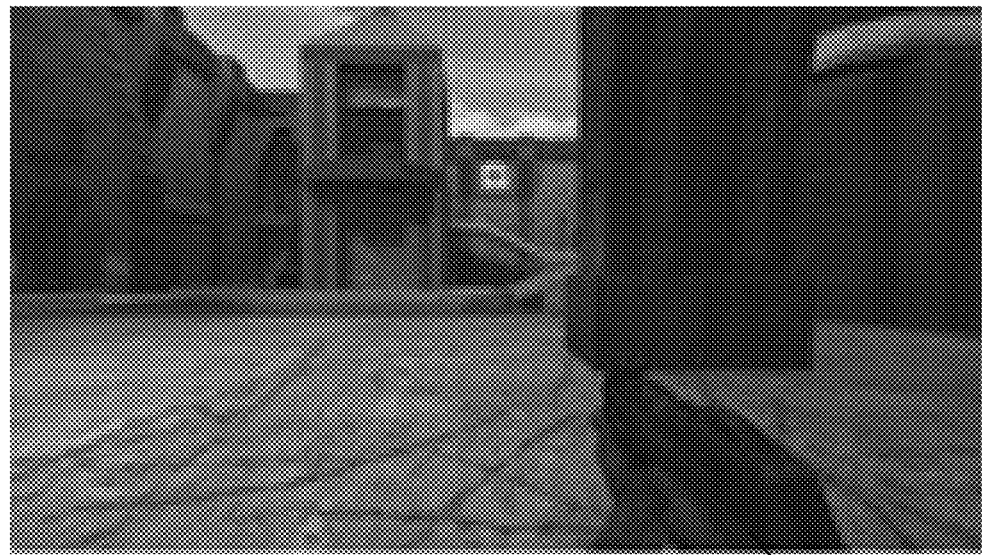
FIG. 11A provides an exemplary RGB frame.
Figure 11B:
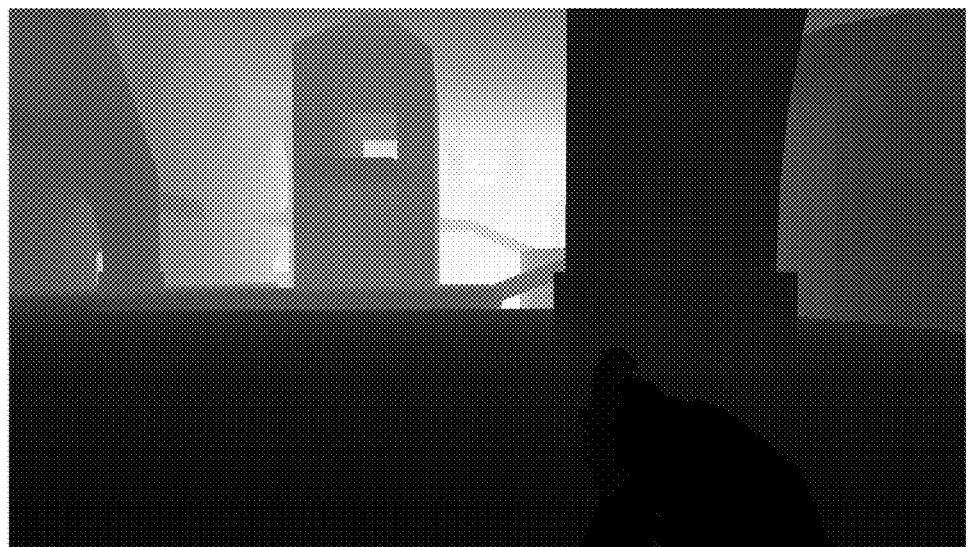
FIG. 11B presents a related depth frame generated for the frame corresponding to the RGB frame of FIG. 11A.

Regarding block 904A and 904B, FIG. 11A provides an exemplary RGB frame 1100, which may be captured from a back buffer that stores an S3D frame. FIG. 11B presents a related depth frame 1110 generated for the same S3D frame. In FIG. 11B, the lighter the image portion, the more remote in depth the objects presented in that image portion are located. Thus, the depth frame 1110 presents a two dimensional representation of depth information as a function of pixel position for objects in an S3D frame.

Regarding block 906, it is noted that users recognize objects by their edge, which may distinguish the border of a given object from other objects. The same situation may apply to depth recognition. Accordingly, in the present embodiments, after formation or receipt of a depth frame for a given S3D frame, edge detection is performed on the depth frame, such as the depth frame 1110 of FIG. 11B. This edge detection may be carried out in various manners. In one exemplary implementation, conventional Roberts kernels are chosen to perform edge detection as shown in the exemplary kernels, which represent one known method for distinguishing pixels from neighbors. This is shown for Roberts kernels 1202 and 1204 shown in respective FIGS. 12A and 12B.

FIG. 13 presents a depth edge frame (diagram) 1300 derived from such a process. A depth gradient can be seen in the FIG. 13 where lighter regions or contours indicate relatively greater depth changes. Thus, light contours may appear in regions where objects of different depths are located next to one another in the depth frame 1110. The darker regions are equivalent to little or no depth changes as a function of position in the depth frame 1110.

Regarding block 908, a grayscale diagram of the depth diagram may be obtained in the following manner. The number of pixels having the same depth value in a depth frame such as depth frame 1110 are summed to $s_i$ while the depth edge frame 1300 is used as a filter. In particular, a function f(x,y) is defined as the pixel value of a pixel located at row x, column y in a depth frame such as depth frame 1110 shown in FIG. 11B. A function u(x,y) is defined to be a pixel value of a pixel located at row x, column y in a depth edge frame such as depth edge frame 1300 shown in FIG. 13. Additionally, a function g(i,x,y) is defined to identify how much the depth changes at a given depth i. This is done by adding up individual g values calculated for all pixels corresponding to a given depth using the function u(x,y) to determine the value at any pixel given by x,y. More particularly, $$g(i, x, y) = \begin{cases} 1 & (\text{if } f(x, y) = i \text{ and } u(x, y) > 0) \\ 0 & (\text{others}) \end{cases} \quad (1)$$

In this manner, the summing is performed according to $$s_i = \sum_{x=0}^{height} \sum_{y=0}^{width} (g(i, x, y)). \quad (2)$$

Thus, each x,y pixel position is associated with a depth value i and a g value, which may be set as "1" or "0" as defined by the operations in Eq. (1). The sum of all g values may then be determined for each depth value i.

FIG. 14 presents an example graph or grayscale diagram that is determined according to Eq. (2) in which i is the depth value from a depth frame and $s_i$ is the sum of all g values for all pixels having depth i. As can be seen, at certain depth ranges (i) the value of $S_i$ is zero, indicating that depth is not varying significantly in these ranges.

Regarding block 910, grayscale smoothening may be provided by calculating a weight $w_i$ of a grayscale diagram. In particular $w_i$ is a weight of depth i in a source frame that is given $w_i = s_i/s$ where $s_i$ is the sum of pixels with depth i and s is sum of pixels in the grayscale diagram, that is, $$s = \sum_{i=0}^{255} s_i. \quad (3)$$

Regarding block 912, once a weighted distribution $w_i$ is calculated, a depth distribution diagram is generated that represents retargeted depth over a comfortable viewing range. FIG. 15 presents an exemplary depth distribution diagram 1500 that may be generated in the following manner:

$$depth_i = comfortable_{range} \times \sum_{j=0}^{i} w_i + nearest, \quad (4)$$

where $depth_i$ is a retargeted depth in screen space for a given virtual depth value i in camera space, $comfortable_{range}$ is the range for comfortable view, and nearest is the nearest comfortable depth needed in screen space. Thus, in the example of FIG. 15, the $depth_i$ values are illustrated as a function of i values from the depth frame 1110. In FIG. 15, N is nearest comfortable perceived depth and F is farthest perceived comfortable depth, while i is virtual depth value. Thus, Eq. 4 can be rewritten as $$depth_i = (N - F) \times \sum_{j=0}^{i} w_i + N. \quad (4A)$$

Figure 16:
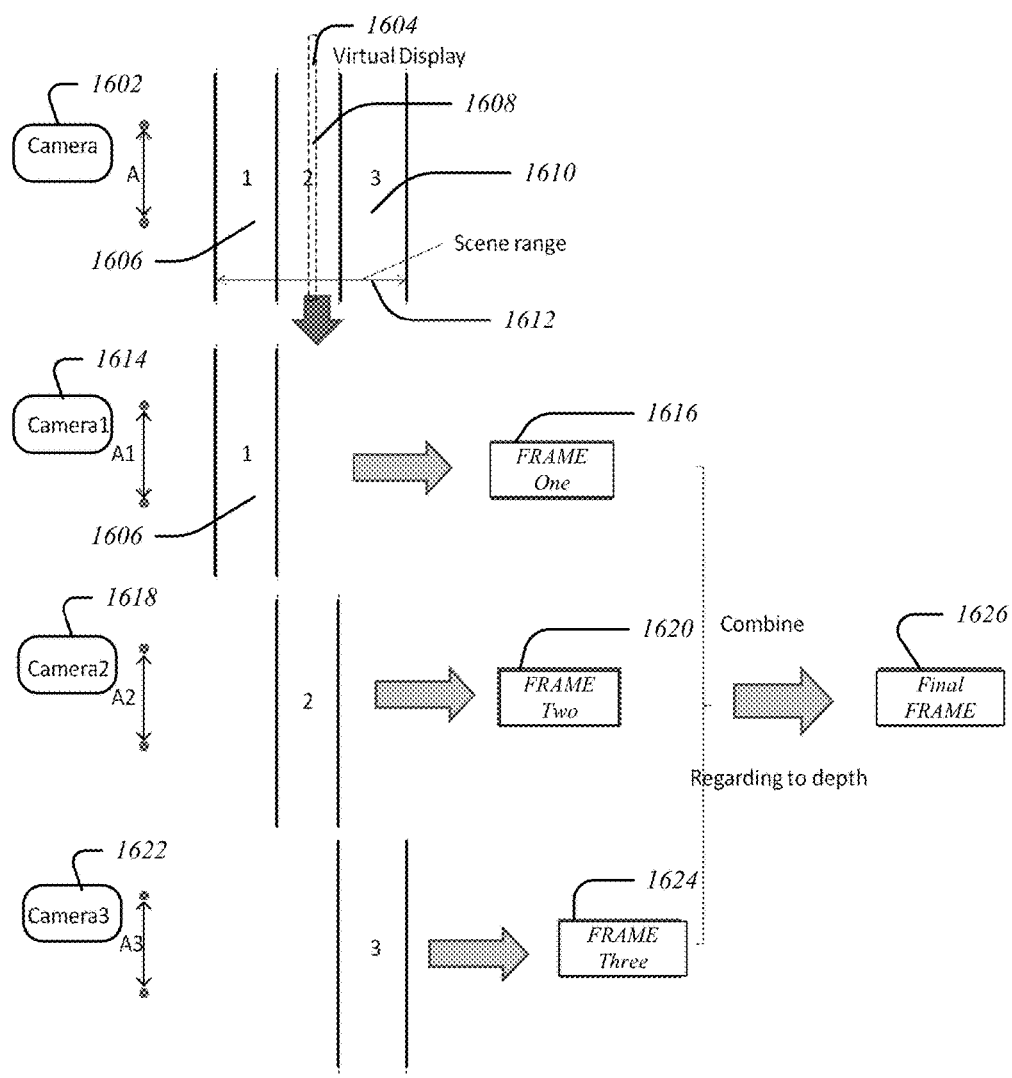
FIG. 16 depicts an example in which a camera is to capture a depth range.

Regarding block 914, different regions corresponding to different depths are defined. In order to maintain frame quality for different depth mapping, different camera pairs are used. FIG. 16 depicts an example in which a camera 1602 is to capture a depth range 1612. For purposes of illustration, the depth range is shown in FIG. 16 as divided into three regions 1606, 1608, and 1610, where region 1608 spans the position of virtual display 1604. In order to generate the desired 3D content consistent with the present embodiments, the camera 1602 is divided into camera1 1614, camera2 1618, and camera3 1622, where camera1 1614 treats region 1606, camera2 1616 treats region 1608, and camera3 1618 treats region 1610, producing the respective frames 1616, 1620 and 1624. These are combined to form the final frame 1626.

Consistent with various embodiments a recursion algorithm may be employed to define different depth regions in the following manner. As a first estimate, the range of i is divided into two parts: [0,i] and [i,255], where i is the point in which a parameter a is maximized, where $$\partial = \max \left| \frac{w_i - 0}{i - 0} - \frac{w_{255} - w_i}{255 - i} \right| (i = 1, \dots 255). \quad (5)$$

Subsequently, a recursion is performed in [0,i] and [i,255] until the parameter $\partial < \alpha$. The quantity "a" represents an experimental value that is 0.1 in some embodiments. Thus, when the value of $\partial$ is below a threshold, a given range is no longer divided.

Figure 17:
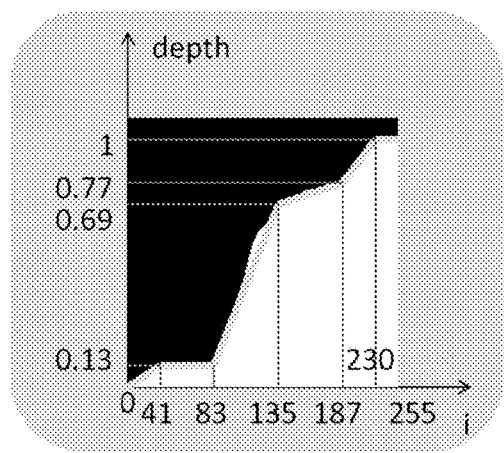
FIG. 17 presents one example of the results of a division process.

FIG. 17 presents one example of the results of the division process for the procedure of Eq. (5) using the depth distribution diagram of FIG. 15, where the number in the depth axis represents a percentage or fraction of a comfortable viewing range (comfortable$_{range}$) and i is the virtual depth value from the depth frame 1110. It can be seen from FIG. 17 that 6 regions are formed, which are defined by respective pairs [0,41], [41,83], [83,135], [135,187], [187,230], and [230,255].

Figure 18:
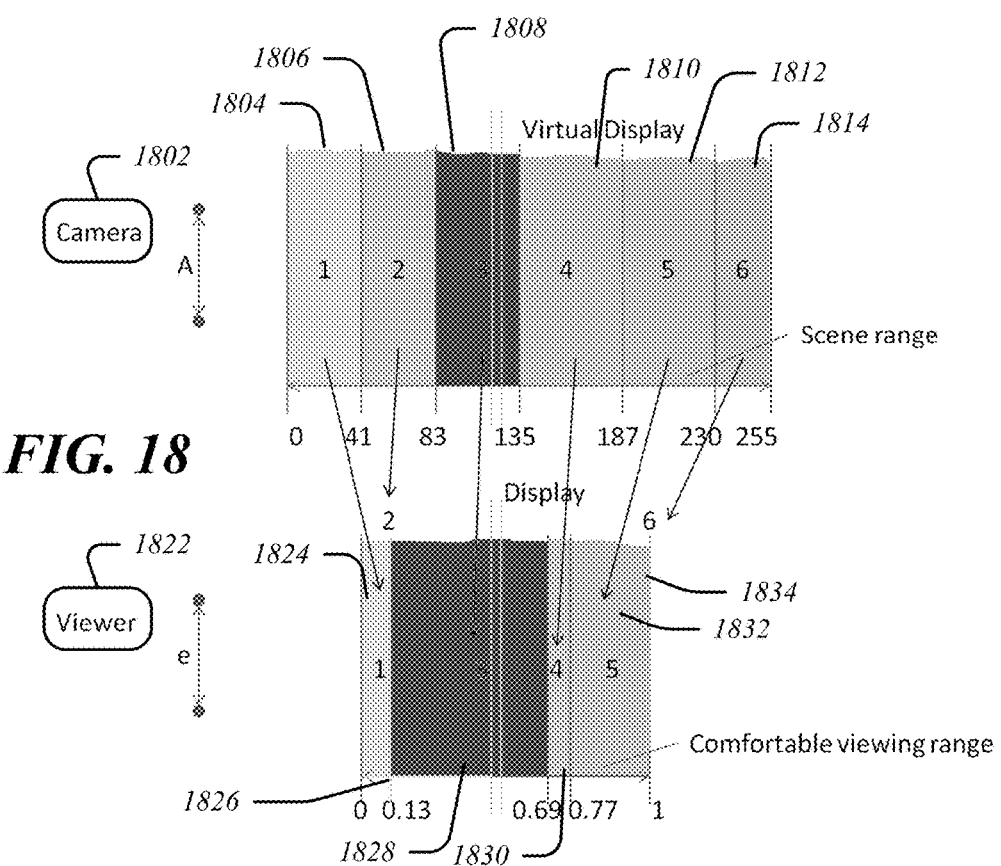
FIG. 18 depicts the relationship between camera space and viewer space following the example of FIG. 17.

FIG. 18 depicts the relationship between camera space and viewer space following the example of FIG. 17. As shown therein, the six depth regions 804, 806, 808, 810, 812, and 814 of camera space map into respective mapped regions 824, 826, 828, 830, 832, and 834 as presented to the viewer 822, when viewing an S3D game on a target device.

Figure 19:
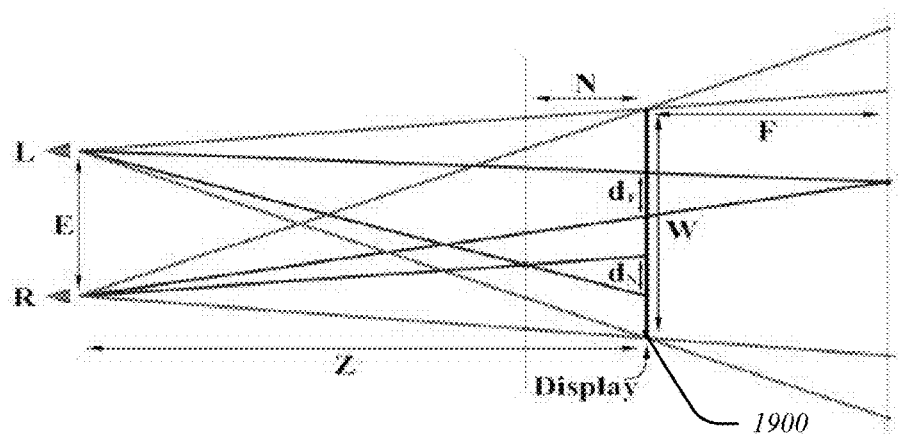
FIGS. 19 and 20 present an example for mapping each of different camera region
using a method for controlling perceived depth in stereoscopic images.
Figure 20:
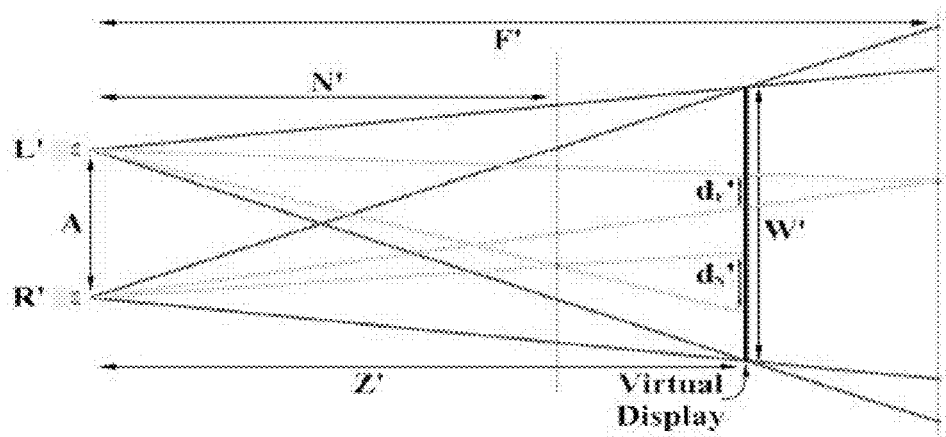

Regarding block 916, to generate a multi-step camera view, camera calculations are performed for different regions. In particular, a camera pair 1 is calculated for region 1 1804, camera pair 2 for region 2 1806, camera pair 3 for region 3 1808, camera pair 4 for region 4 1810, camera pair 5 for region 5 1812, and camera pair 6 for region 6 1814. In the present embodiments for mapping each region, the method for controlling perceived depth in stereoscopic images taught by Graham Jones's may be used. Jones's method defines the relationship between the parameters in viewer space and scene space, as illustrated in respective FIGS. 19 and 20. FIG. 19 shows the relation of a viewers left and right eyes L and R in relation to a display 1900 and the N and F parameters defined above. In particular, this method can perform linear mapping from [N',F'] in FIG. 20 to [Z−N, Z+F] in FIG. 19.

Figure 21:
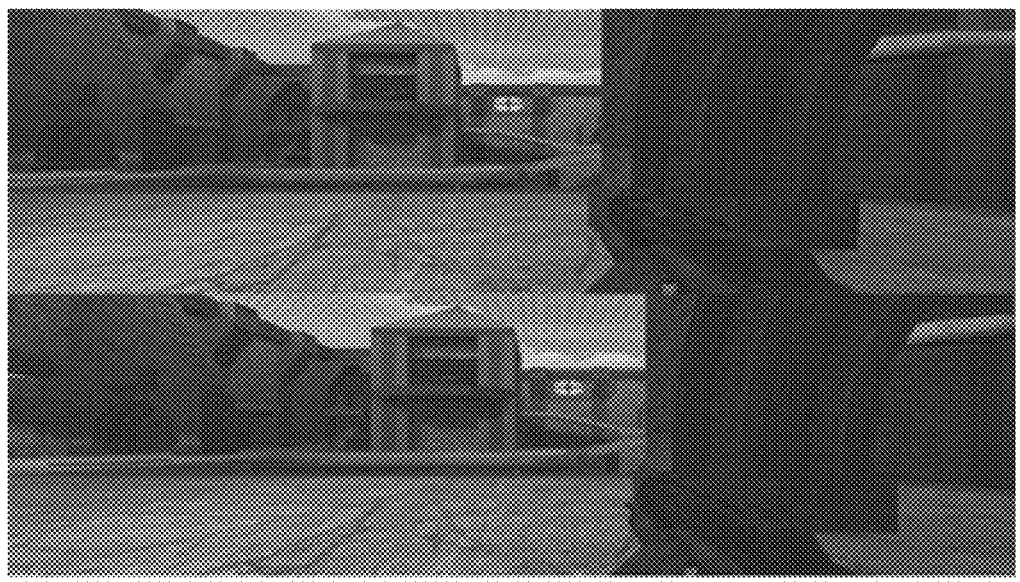
FIG. 21 presents left and right images based upon the image of FIG. 11A.
Figure 22:
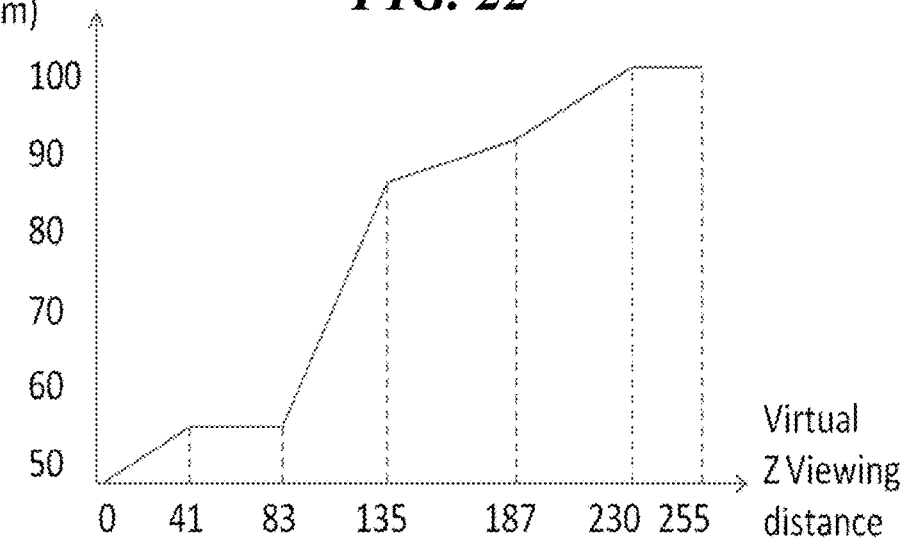
FIG. 22 presents a graph of perceived depth as a function of virtual viewing distance for the scene of FIG. 21.

Regarding block 918 camera views for different depths may be combined after views from different regions are obtained. Let $L_1$, $L_2$, $L_3$, $L_4$, $L_5$, $L_6$ represent the left view and $R_1$, $R_2$, $R_3$, $R_4$, $R_5$, $R_6$ represent the right views in regions [0,41], [41,83], [83,135], [135,187], [187,230] [230, 255]. To form the left view, $L_1$, $L_2$, $L_3$, $L_4$, $L_5$, $L_6$ are combined into L for Left View for the given frame, and $R_1$, $R_2$, $R_3$, $R_4$, $R_5$, $R_6$ into R for the right view. A result of these combination operations is shown in FIG. 21, which presents left and right images based upon the image 1100 of FIG. 11A. In addition, FIG. 22 presents a graph of perceived depth as a function of virtual viewing distance for the scene of FIG. 21. It can be seen that virtual z viewing distance (virtual depth) for the range [83,135] is much larger in perceived depth while the virtual z viewing distances for the ranges [41,83] and [230, 250] occupy almost zero range in perceived depth. Compared with conventional linear depth retargeting results the depth information in the range [83, 135] is much more preserved in its original form, while other virtual depth ranges are compressed. This result exemplifies the ability of the present embodiments to emphasize a virtual depth range, such as [83, 135], which may be the most important range to end users because of content contained therein.

Figure 23:
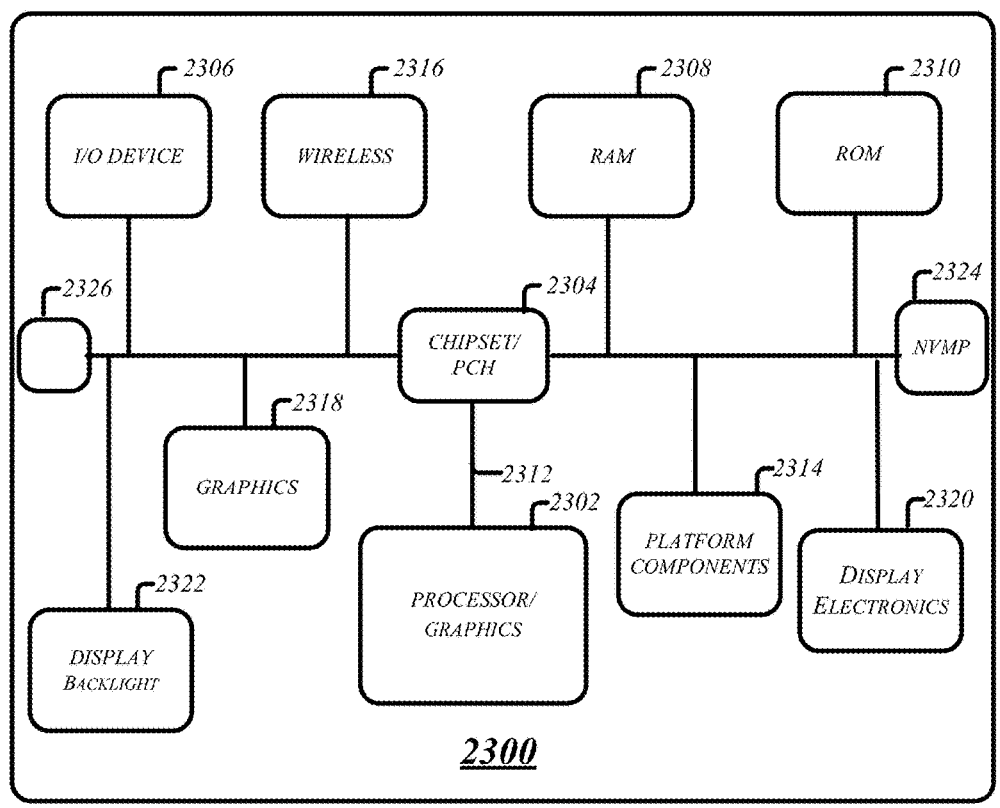
FIG. 23 presents an exemplary system embodiment.

FIG. 23 is a diagram of an exemplary system embodiment and in particular, FIG. 23 is a diagram showing a system 2300, which may include various elements. For instance, FIG. 23 shows that system (platform) 2300 may include a processor/graphics core, termed herein processor 2302, a chipset/platform control hub (PCH), termed herein chipset 2304, an input/output (I/O) device 2306, a random access memory (RAM) (such as dynamic RAM (DRAM)) 2308, and a read only memory (ROM) 2310, display electronics 2320, display backlight 2322, and various other platform components 2314 (e.g., a fan, a crossflow blower, a heat sink, DTM system, cooling system, housing, vents, and so forth). System 2300 may also include wireless communications chip 2316 and graphics device 2318, non-volatile memory port (NVMP) 2324, and antenna 2326. The embodiments, however, are not limited to these elements.

As shown in FIG. 23, I/O device 2306, RAM 2308, and ROM 2310 are coupled to processor 2302 by way of chipset 2304. Chipset 2304 may be coupled to processor 2302 by a bus 2312. Accordingly, bus 2312 may include multiple lines.

Processor 2302 may be a central processing unit comprising one or more processor cores and may include any number of processors having any number of processor cores. The processor 2302 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 2302 may be multiple separate processors located on separate integrated circuit chips. In soME Embodiments processor 2302 may be a processor having integrated graphics, while in other embodiments processor 2302 may be a graphics core or cores. Commands can be provided to processor 2302, for example, through keyboard, TOuch screen interaction, gestures, facial expressions, and sounds.

In summary, the present embodiments provide enhanced usage models of the computing continuum which provide for the ability to obtain target device configuration for 3D content sharing. In particular, the real-time interest aware disparity mapping methods provide a novel implementation for S3D sharing. In comparison to linear disparity mapping conventionally used in real-time depth retargeting, the present embodiments are based on content analysis results for depth retargeting.

The methods of the present embodiments in particular facilitate selection of a morE IMportant depth range(s) that is to be less altered for presentation in a user device in comparison to other depth ranges. Final depth retargeting results in the generation of a series of virtual depth ranges in which perceIVED depth varies with virtual depth (viewing range) in different fashion among the different virtual depth ranges. This leads to generation of select virtual depth ranges in which objects or other content are expanded or less compressed in perceived depth aS OPposed to objects or content in other virtual depth ranges, thereby allowing an entire scene of a S3D frame to be presented on a user screen within a comfortable viewing range without unduly altering important content of the S3D frame.

The following examples pertain to further embodiments.

In example 1, an apparatus for mapping a stereo three dimensional game may include a processor to retrieve a stereo three dimensional (S3D) frame of an S3D game, the frame comprising a red-green-blue (RGB) frame and depth frame; and an interest aware disparity mapping component to: generate a depth edge frame from the depth frame and to generate a depth distribution diagram for the depth frame based on the depth edge frame, the depth distribution diagram defining a multiplicity of camera regions for generating a mapped S3D frame for a target device based upon viewing parameters of the target device.

In example 2, the viewing parameters of the target device of example 1 may include screen size and expected viewing distance for the target device.

In example 3, the depth frame of any of examples 1-2 may comprise a two dimensional representation of depth information as a function of pixel position for objects depicted in the S3D frame.

In example 4, the depth edge frame of any of examples 1-3 may comprise a set of pixels (x,y) and values u(x,y) where u(x,y) is proportional to a change in depth in pixels adjacent to pixel (x,y).

In example 5 the interest aware disparity mapping component of any of examples 1-4 may be to generate a grayscale diagram comprising depth change information from the depth frame, the grayscale diagram comprising $s_i$ as a function of depth i, where $$s_i = \sum_{x=0}^{height} \sum_{y=0}^{width} (g(i, x, y)) \text{ and where}$$

$$g(i, x, y) = \begin{cases} 1 & (\text{if } f(x, y) = i \text{ and } u(x, y) > 0) \\ 0 & (\text{others}) \end{cases}.$$

In example 6 the depth distribution diagram of any of examples 1-5 may comprise a retargeted depth in screen space of the target device, depths as a function of i, where $$depth_i = (N - F) \times \sum_{j=0}^{i} w_i + N$$

where N and F are nearest comfortable perceived depth and furthest comfortable perceived depth for the target device, and $w_i$ is a weighted average of $s_i$.

In example 7 the interest aware disparity mapping component of any of examples 1-6 may be to determine the multiplicity of camera regions by applying a recursion process to the depth distribution diagram.

In example 8 the interest aware disparity mapping component of any of examples 1-7 may be to calculate a camera parameter for each of the multiplicity of camera regions.

In example 9 the interest aware disparity mapping component of any of examples 1-8 may be to generate a mapped left frame L and right frame R for presentation of the S3D frame on the target device, where L and R are a sum of respective left camera views and right camera views of the multiplicity of camera regions.

In example 10, the apparatus of any of examples 1-9 may include a display to present the S3D video, a network interface and radio.

In example 11, at least one machine-readable storage medium includes instructions that when executed by a computing device, cause the computing device to: receive viewing parameters of a target device; retrieve a stereo three dimensional (S3D) frame of an S3D game comprising a red-green-blue (RGB) frame and depth frame; generate a depth edge frame from the depth frame; and generate a depth distribution diagram for the depth frame based on the depth edge frame, the depth distribution diagram defining a multiplicity of camera regions for generating a mapped S3D frame for a target device based upon viewing parameters of the target device.

In example 12, the viewing parameters of the target device of the at least one machine-readable storage medium of example 11 may include screen size and expected viewing distance for the target device.

In example 13, the depth frame of any of examples 11-12 may include a two dimensional representation of depth information as a function of pixel position for objects depicted in the S3D frame.

In example 14, the depth edge frame of any of examples 11-13 may include a set of pixels (x,y) and values u(x,y) where u(x,y) is proportional to a change in depth in pixels adjacent to pixel (x,y).

In example 15, the at least one machine-readable storage medium of any of examples 11-14, may comprise instructions that when executed by a computing device, cause the computing device to: generate a grayscale diagram comprising depth change information from the depth frame, the grayscale diagram comprising $s_i$ as a function of depth i, where $$s_i = \sum_{x=0}^{height} \sum_{y=0}^{width} (g(i, x, y)) \text{ and where}$$

$$g(i, x, y) = \begin{cases} 1 & (\text{if } f(x, y) = i \text{ and } u(x, y) > 0) \\ 0 & (\text{others}) \end{cases}.$$

In example 16, the depth distribution diagram of any of examples 11-15 may include a retargeted depth in screen space of the target device, depths as a function of i, where $$depth_i = (N - F) \times \sum_{j=0}^{i} w_i + N$$

where N and F are nearest comfortable perceived depth and furthest comfortable perceived depth for the target device, and $w_i$ is a weighted average of $s_i$.

In example 17, the at least one machine-readable storage medium of any of examples 11-16, may comprise instructions that when executed by a computing device, cause the computing device to determine the multiplicity of camera regions by applying a recursion process to the depth distribution diagram.

In example 18, the at least one machine-readable storage medium of any of examples 11-17, may comprise instructions that when executed by a computing device, cause the computing device to calculate a camera parameter for each of the multiplicity of camera regions.

In example 19, the at least one machine-readable storage medium of any of examples 11-18, may comprise instructions that when executed by a computing device, cause the computing device to generate a mapped left frame L and right frame R for presentation of the S3D frame on the target device, where L and R are a sum of respective left camera views and right camera views of the multiplicity of camera regions.

In example 20, a computer implemented method for mapping a stereo three dimensional game may include: receiving viewing parameters of a target device; retrieving a stereo three dimensional (S3D) frame of an S3D game comprising a red-green-blue (RGB) frame and depth frame; generating a depth edge frame from the depth frame; and generating a depth distribution diagram for the depth frame based on the depth edge frame, the depth distribution diagram defining a multiplicity of camera regions for generating a mapped S3D frame for a target device based upon viewing parameters of the target device.

In example 21, the viewing parameters of the target device of example 20 may include screen size and expected viewing distance for the target device, and the depth frame comprising a two dimensional representation of depth information as a function of pixel position for objects depicted in the S3D frame.

In example 22, the depth edge frame of any of examples 20-21 may include a set of pixels (x,y) and values u(x,y) where u(x,y) is proportional to a change in depth in pixels adjacent to pixel (x,y).

In example 23, the computer implemented method of any of examples 20-22 may include: generating a grayscale diagram comprising depth change information from the depth frame, the grayscale diagram comprising $s_i$ as a function of depth i, where $$s_i = \sum_{x=0}^{height} \sum_{y=0}^{width} (g(i, x, y)) \text{ and where}$$

$$g(i, x, y) = \begin{cases} 1 & (\text{if } f(x, y) = i \text{ and } u(x, y) > 0) \\ 0 & (\text{others}) \end{cases}.$$

In example 24, the depth distribution diagram of any of examples 20-23 may include retargeted depth in screen space of the target device, depths as a function of i, where $$depth_i = (N - F) \times \sum_{j=0}^{i} w_i + N$$

where N and F are nearest comfortable perceived depth and furthest comfortable perceived depth for the target device, and $w_i$ is a weighted average of $s_i$.

In example 25, the computer implemented method of any of examples 20-24 may include calculating a camera parameter for each of the multiplicity of camera regions.

In example 26, the computer implemented method of any of examples 20-25 may include generating a mapped left frame L and right frame R for presentation of the S3D frame on the target device, where L and R are a sum of respective left camera views and right camera views of the multiplicity of camera regions.

Example 27 is user equipment to manage I/O data comprising means to perform the method of any of examples 20-26.

Example 28 is an apparatus to manage I/O data comprising means to perform the method of any one of examples 20-26.

In example 29, at least one machine-readable storage medium includes instructions that when executed by a computing device, cause the computing device to: perform the method of any of examples 20-26.

In example 30 a device for mapping a stereo three dimensional game, includes: a processor to retrieve a stereo three dimensional (S3D) frame of an S3D game, the frame comprising a red-green-blue (RGB) frame and depth frame; a communications interface to receive viewing parameters of a target device; and an interest aware disparity mapping component to: generate a depth edge frame from the depth frame and generate a depth distribution diagram for the depth frame based on the depth edge frame, the depth distribution diagram defining a multiplicity of camera regions for generating a mapped S3D frame for the target device based upon the viewing parameters of the target device.

In example 31 the viewing parameters of the target device of example 30 may include screen size and expected viewing distance for the target device.

In example 32 the depth frame of any of examples 30-31 may include a two dimensional representation of depth information as a function of pixel position for objects depicted in the S3D frame.

In example 33, the depth edge frame of any of examples 30-32 may include a set of pixels (x,y) and values u(x,y) where u(x,y) is proportional to a change in depth in pixels adjacent to pixel (x,y).

In example 34, the interest aware disparity mapping component of any of examples 30-33 may be to generate a grayscale diagram comprising depth change information from the depth frame, the grayscale diagram comprising $s_i$ as a function of depth i, where $$s_i = \sum_{x=0}^{height} \sum_{y=0}^{width} (g(i, x, y)) \text{ and where}$$

$$g(i, x, y) = \begin{cases} 1 & (\text{if } f(x, y) = i \text{ and } u(x, y) > 0) \\ 0 & (\text{others}) \end{cases}.$$

In example 35, the depth distribution diagram of any of examples 30-34 may include a retargeted depth in screen space of the target device, depths as a function of i, where $$depth_i = (N - F) \times \sum_{j=0}^{i} w_i + N$$

where N and F are nearest comfortable perceived depth and furthest comfortable perceived depth for the target device, and $w_i$ is a weighted average of $s_i$.

In example 36 the interest aware disparity mapping component of any of examples 30-35 may be to determine the multiplicity of camera regions by applying a recursion process to the depth distribution diagram.

In example 37 the interest aware disparity mapping component of any of examples 30-36 may be to calculate a camera parameter for each of the multiplicity of camera regions.

In example 38 the interest aware disparity mapping component of any of examples 30-37 may be to generate a mapped left frame L and right frame R for presentation of the S3D frame on the target device, where L and R are a sum of respective left camera views and right camera views of the multiplicity of camera regions.

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a processor; and
a memory storing instructions which when executed by the processor, cause the processor to:
retrieve a stereo three-dimensional (S3D) frame of an S3D game, the frame comprising a red-green-blue (RGB) frame and depth frame;
generate a depth edge frame from the depth frame;
generate a grayscale diagram comprising depth change information from the depth frame;
smooth the grayscale diagram based on a sum of pixels in the grayscale diagram; and
generate a depth distribution diagram for the depth frame based on the depth edge frame and the sum of pixels in the smoothed grayscale diagram, the depth distribution diagram defining a multiplicity of camera regions for generating a mapped S3D frame for a target device based upon viewing parameters of the target device.

2. The apparatus of claim 1, the viewing parameters of the target device including screen size and expected viewing distance for the target device.

3. The apparatus of claim 1, the depth frame comprising a two-dimensional representation of depth information as a function of pixel position for objects depicted in the S3D frame.

4. The apparatus of claim 1, the depth edge frame comprising a set of pixels (x,y) and values u(x,y) where u(x,y) is proportional to a change in depth in pixels adjacent to pixel (x,y).

5. The apparatus of claim 4, the grayscale diagram comprising $s_i$ as a function of depth i, where $$s_i = \sum_{x=0}^{height} \sum_{y=0}^{width} (g(i, x, y)) \text{ and where}$$

$$g(i, x, y) = \begin{cases} 1 & \text{(if } f(x, y) = i \text{ and } u(x, y) > 0) \\ 0 & \text{(others)} \end{cases}.$$

6. The apparatus of claim 5, the depth distribution diagram comprising retargeted depth in screen space of the target device, $depth_i$ as a function of i, where $$depth_i = (N - F) \times \sum_{j=0}^{i} w_i + N$$

where N and F are nearest comfortable perceived depth and furthest comfortable perceived depth for the target device, and $w_i$ is a weighted average of $s_i$.

7. The apparatus of claim 5, the instructions executable by the processor to determine the multiplicity of camera regions by applying a recursion process to the depth distribution diagram.

8. The apparatus of claim 1, the instructions executable by the processor to calculate a camera parameter for each of the multiplicity of camera regions.

9. The apparatus of claim 1, the instructions executable by the processor to generate a mapped left frame L and right frame R for presentation of the S3D frame on the target device, where L and R are a sum of respective left camera views and right camera views of the multiplicity of camera regions.

10. The apparatus of claim 1, comprising a display to present the mapped S3D frame, a network interface and radio.

11. At least one non-transitory machine-readable storage medium comprising instructions that when executed by a computing device, cause the computing device to:
receive viewing parameters of a target device;
retrieve a stereo three-dimensional (S3D) frame of an S3D game comprising a red-green-blue (RGB) frame and depth frame;
generate a depth edge frame from the depth frame;
generate a grayscale diagram comprising depth change information from the depth frame;
smooth the grayscale diagram based on a sum of pixels in the grayscale diagram; and
generate a depth distribution diagram for the depth frame based on the depth edge frame and the sum of pixels in the smoothed grayscale diagram, the depth distribution diagram defining a multiplicity of camera regions for generating a mapped S3D frame for the target device based upon the viewing parameters of the target device.

12. The at least non-transitory one machine-readable storage medium of claim 11, the viewing parameters of the target device including screen size and expected viewing distance for the target device.

13. The at least one non-transitory machine-readable storage medium of claim 11, the depth frame comprising a two-dimensional representation of depth information as a function of pixel position for objects depicted in the S3D frame.

14. The at least one non-transitory machine-readable storage medium of claim 11, the depth edge frame comprising a set of pixels (x,y) and values u(x,y) where u(x,y) is proportional to a change in depth in pixels adjacent to pixel (x,y).

15. The at least one non-transitory machine-readable storage medium of claim 14,
the grayscale diagram comprising $s_i$ as a function of depth i, where $$s_i = \sum_{x=0}^{height} \sum_{y=0}^{width} (g(i, x, y)) \text{ and where}$$

$$g(i, x, y) = \begin{cases} 1 & (\text{if } f(x, y) = i \text{ and } u(x, y) > 0) \\ 0 & (\text{others}) \end{cases}.$$

16. The at least one non-transitory machine-readable storage medium of claim 15, the depth distribution diagram comprising retargeted depth in screen space of the target device, $depth_i$ as a function of i, where $$depth_i = (N - F) \times \sum_{j=0}^{i} w_i + N$$

where N and F are nearest comfortable perceived depth and furthest comfortable perceived depth for the target device, and $w_i$ is a weighted average of $s_i$.

17. The at least one non-transitory machine-readable storage medium of claim 11, comprising instructions that when executed by the computing device, cause the computing device to calculate a camera parameter for each of the multiplicity of camera regions.

18. The at least one non-transitory machine-readable storage medium of claim 11, comprising instructions that when executed by the computing device, cause the computing device to generate a mapped left frame L and right frame R for presentation of the S3D frame on the target device, where L and R are a sum of respective left camera views and right camera views of the multiplicity of camera regions.

19. A computer implemented method, comprising:
receiving viewing parameters of a target device;
retrieving a stereo three-dimensional (S3D) frame of an S3D game comprising a red-green-blue (RGB) frame and depth frame;
generating a depth edge frame from the depth frame;
generating a grayscale diagram comprising depth change information from the depth frame;
smoothing the grayscale diagram based on a sum of pixels in the grayscale diagram; and
generating a depth distribution diagram for the depth frame based on the depth edge frame and the sum of pixels in the smoothed grayscale diagram, the depth distribution diagram defining a multiplicity of camera regions for generating a mapped S3D frame for the target device based upon the viewing parameters of the target device.

20. The computer implemented method of claim 19, the viewing parameters of the target device including screen size and expected viewing distance for the target device, and the depth frame comprising a two-dimensional representation of depth information as a function of pixel position for objects depicted in the S3D frame.

21. The computer implemented method of claim 19, the depth edge frame comprising a set of pixels (x,y) and values u(x,y) where u(x,y) is proportional to a change in depth in pixels adjacent to pixel (x,y).

22. The computer implemented method of claim 21, the grayscale diagram comprising $s_i$ as a function of depth i, where $$s_i = \sum_{x=0}^{height} \sum_{y=0}^{width} (g(i, x, y)) \text{ and where}$$

$$g(i, x, y) = \begin{cases} 1 & (\text{if } f(x, y) = i \text{ and } u(x, y) > 0) \\ 0 & (\text{others}) \end{cases}.$$

23. The computer implemented method of claim 22, the depth distribution diagram comprising retargeted depth in screen space of the target device, $depth_i$ as a function of i, where $$depth_i = (N - F) \times \sum_{j=0}^{i} w_i + N$$

where N and F are nearest comfortable perceived depth and furthest comfortable perceived depth for the target device, and $w_i$ is a weighted average of $s_i$.

24. The computer implemented method of claim 21, comprising generating a mapped left frame L and right frame R for presentation of the S3D frame on the target device, where L and R are a sum of respective left camera views and right camera views of the multiplicity of camera regions.

25. The computer implemented method of claim 19, comprising calculating a camera parameter for each of the multiplicity of camera regions.

* * * * *